United States Patent
Weinstein et al.

(10) Patent No.: US 11,544,335 B2
(45) Date of Patent: Jan. 3, 2023

(54) PROPENSITY-DRIVEN SEARCH RESULTS

(71) Applicant: Steady Platform LLC, Atlanta, GA (US)

(72) Inventors: Lior Weinstein, Atlanta, GA (US); Amanda Miguel, Los Angeles, CA (US)

(73) Assignee: Steady Platform LLC, Atlanta, GA (US)

( * ) Notice: Subject to any disclaimer, the term of this patent is extended or adjusted under 35 U.S.C. 154(b) by 480 days.

(21) Appl. No.: 16/572,830

(22) Filed: Sep. 17, 2019

(65) Prior Publication Data

US 2021/0081474 A1    Mar. 18, 2021

(51) Int. Cl.
*G06F 16/00* (2019.01)
*G06F 16/9535* (2019.01)
*G06F 16/9537* (2019.01)
*G06N 3/08* (2006.01)
*H04L 67/50* (2022.01)

(52) U.S. Cl.
CPC ...... *G06F 16/9535* (2019.01); *G06F 16/9537* (2019.01); *G06N 3/08* (2013.01); *H04L 67/535* (2022.05)

(58) Field of Classification Search
CPC ...... G06F 16/176; G06F 16/248; G06F 16/29; G06F 16/335; G06F 16/9535; G06F 16/9537; G06F 21/6245; G06F 16/437; G06F 16/986; G06Q 10/10; G06Q 10/1053; G06Q 10/06; G06Q 30/08; G06Q 10/105; G06Q 50/01; G06Q 10/1057; G06Q 20/3821; G06Q 20/4014; G06Q 30/02; G06Q 30/0201; G06Q 30/0226; G06Q 30/0645; G06Q 40/06; G06Q 50/10; G06Q 50/16

See application file for complete search history.

(56) References Cited

U.S. PATENT DOCUMENTS

| | | | |
|---|---|---|---|
| 11,056,222 B1* | 7/2021 | Nambirajan | G06F 16/9027 |
| 11,263,677 B2* | 3/2022 | Gutman | G06Q 30/0639 |
| 2006/0229896 A1* | 10/2006 | Rosen | G06Q 10/1053 |
| | | | 705/321 |
| 2008/0140656 A1* | 6/2008 | Panda | G06Q 10/06 |

(Continued)

*Primary Examiner* — Yicun Wu
(74) *Attorney, Agent, or Firm* — Buckley, Maschoff & Talwalkar LLC (57) ABSTRACT

Provided are systems and methods for generating propensity-driven employment-based search results. In one example, a method may include retrieving consumption data of a user associated with the user device and geographic location data of at least one of the user and the user device, the consumption data comprising behavior of the user captured over time, predicting one or more value-generating opportunities for the user from among a pool of value-generating opportunities via execution of a predictive model, where the predictive model determines a propensity of the user to respond to the value-generating opportunities based on the behavioral attributes included in the retrieved consumption data of the user and the geographical location data, and transmitting the one or more predicted value-generating opportunities to the user device via a content channel between the server and the user device.

20 Claims, 8 Drawing Sheets

(56) References Cited

U.S. PATENT DOCUMENTS

| | | | | |
|---|---|---|---|---|
| 2009/0327013 A1* | 12/2009 | McGovern | ......... | G06Q 10/1053 |
| | | | | 705/321 |
| 2010/0161503 A1* | 6/2010 | Foster | ................ | G06Q 10/1053 |
| | | | | 705/321 |
| 2010/0250303 A1* | 9/2010 | Price | .................... | G06F 16/986 |
| | | | | 705/321 |
| 2016/0132934 A1* | 5/2016 | Hartlaub | ............ | G06Q 30/0269 |
| | | | | 705/14.64 |
| 2017/0323384 A1* | 11/2017 | Dintenfass | ......... | G06Q 20/4014 |
| 2020/0160386 A1* | 5/2020 | Chan | ................. | G06Q 30/0255 |

* cited by examiner

FIG. 2A
(Offline Training)

FIG. 2B
(Online)

FIG. 2C

FIG. 3A
(Offline Training)

300A

FIG. 3B
(Online)

PROPENSITY-DRIVEN SEARCH RESULTS

BACKGROUND

More and more people are finding that they need multiple jobs to keep up with financial demands and the are routinely facing dramatic shifts in income from one month to the next. By not having a stable income and relying on more than one income source on a regulator basis makes it difficult for such workers to qualify for financial services. People who find themselves in this situation often turn to high-interest credit cards or payday lending to fill gaps in their budgets.

Recently, individuals have begun using web-based resources (mobile applications, websites, etc.) to post and find jobs. For example, in a shared economy, also referred to as a gig economy, organizations and individuals may contract with independent workers for short-term engagements, longer-term temporary engagements, full-time positions, and the like. The trend towards a gig economy is well underway. A recent study predicted that by 2020, approximately forty percent (40%) of American workers will have some form of earnings as an independent contractor. A contributing factor for this shift is due to the increasing mobility of jobs. In many cases, job performance and its location are decoupled allowing for jobs to be performed remotely or at multiple locations.

One of the difficulties in a shared economy environment is connecting potential employees with employment opportunities they are likely to be of interest. For example, two people with similar educational backgrounds may have very different interests when it comes to the type of employment they desire. A typical job-based search engine receives various keywords and provides a list of search results thereon. However, these search engines fail to consider attributes of the user that can influence the user's interests in a job opportunity. As a result, many of the search results provided are not of interest to a particular user. Accordingly, what is needed is an improved mechanism for providing users with optimized job-related information in a rich user convenient format.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, details are set forth to provide a thorough understanding of various example embodiments. It should be appreciated that modifications to the embodiments will be readily apparent to those skilled in the art, and generic principles defined herein may be applied to other embodiments and applications without departing from the spirit and scope of the disclosure. Moreover, in the following description, numerous details are set forth as an explanation. However, one of ordinary skill in the art should understand that embodiments may be practiced without the use of these specific details. In other instances, well-known structures and processes are not shown or described so as not to obscure the description with unnecessary detail. Thus, the present disclosure is not intended to be limited to the embodiments shown, but is to be accorded the widest scope consistent with the principles and features disclosed herein.

As the reach of the Internet continues to grow, more users are relying on web-based forums (websites, mobile applications, etc.) for posting and finding employment opportunities. An example of such an income-building platform is Steady (also known as Steady App). Steady provides a forum where employers may post jobs for workers looking to supplement their income by taking part-time, one-time, and temporary job opportunities. The income building platform may include a web environment such as a mobile application, website, etc., where users can interact with job opportunities and also contact potential employers directly.

One of the significant drawbacks for a user of an employment-based platform is the difficulty in finding employment opportunities that are of interest to the user. The user is often required to perform their own search process (e.g., keywords, etc.) which are matched to descriptions of employment opportunity postings. A user may repetitively type in various keywords and perform different searches creating frustration and lack of interest for the user. From the employment-based platform perspective, it is difficult to generally classify people (users) of the site based on education, work experience, and the like, because two people with similar backgrounds may have very different interests when it comes to performing secondary employment.

The example embodiments overcome these drawbacks by predicting employment opportunities that a user will be interested in based on behavior (e.g., consumption of money, goods, device usage, and the like) of the user. For example, patterns in the consumption behavior of a user can be a good indicator of the type of secondary employment they the user will be interested in rather than static data such as work history, education history, or the like (however, this information can also be considered by the system). The prediction can be performed via execution of a predictive model that is trained on historical attributes of consumption data of other users and their secondary work experiences. The predictive model can learn patterns between what a person consumes versus what a person is interested in doing as a source of secondary employment.

According to various embodiments, consumption data may include data indicative of how (behavior) a user spends their money. For example, consumption data may be obtained or observed from (e.g., credit card statements, bank account statements, purchase information/receipts, etc.) of the user which can be retrieved by the system based on approval from the user. For example, the system may retrieve the consumption data via one or more application programming interfaces (APIs) offered by financial institutions to gain access to their stored data such as credit card companies, payment processors, banks, financial institutions, and the like. As another example, consumption data may be include device usage, Internet usage, etc. which indicates financial interests/spending interests of the user. In addition to consumption data, the predictive model may also be geographically-oriented. For example, in some cases, the predictive model may be trained based on user data that is within a specific geographic distance with respect to the current user, a geographical metro area, a city, etc.

The example embodiments also provide a system which can use collaborative filtering to show a user how other people with similar characteristics (e.g., productivity data, consumption data, etc.) make money through secondary opportunities. As described herein, productivity data is data income generating behavior that is indicative of how a user earns or makes their income. In a traditional sense, this information may include educational achievements, work history, certificates earned, licenses obtained, and the like. Productivity data may also include a geo-location, a time of day that the usually is available, the amount of time a user spends per day/week, etc. working, and the like.

As mentioned, secondary income is often earned in fields that are not of primary educational or prior work experience for a user. Furthermore, with the expanse of the Internet, more and more opportunities to generate income are becoming available. A new user to a secondary employment website may not be familiar with the opportunities that are availed to the user through gig economy/shared economy. Collaborative filtering may provide a user with knowledge of how other users with similar consumption (spending activity) and/or productivity (income generating activity) earn secondary income. The system herein may execute a collaborative filtering model to identify similar users (productivity, consumption, etc.) and what they do for secondary income, and provide this information to the user.

Figure 1A:
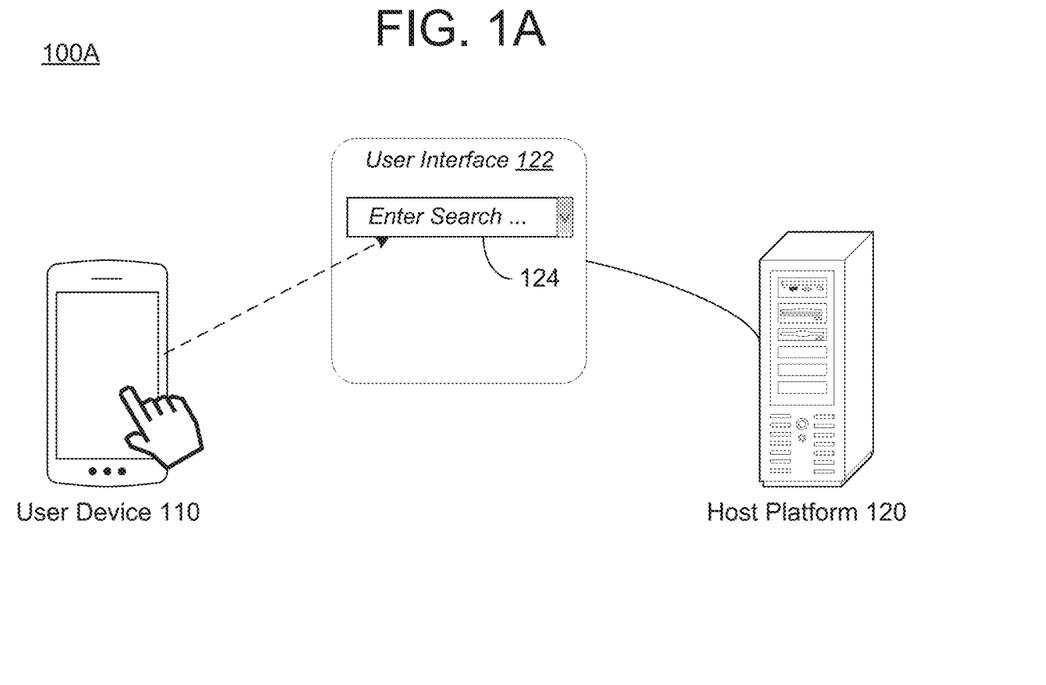
FIGS. 1A and 1B are diagrams illustrating a system for generating propensity-driven search results in accordance with an example embodiment.
Figure 1B:
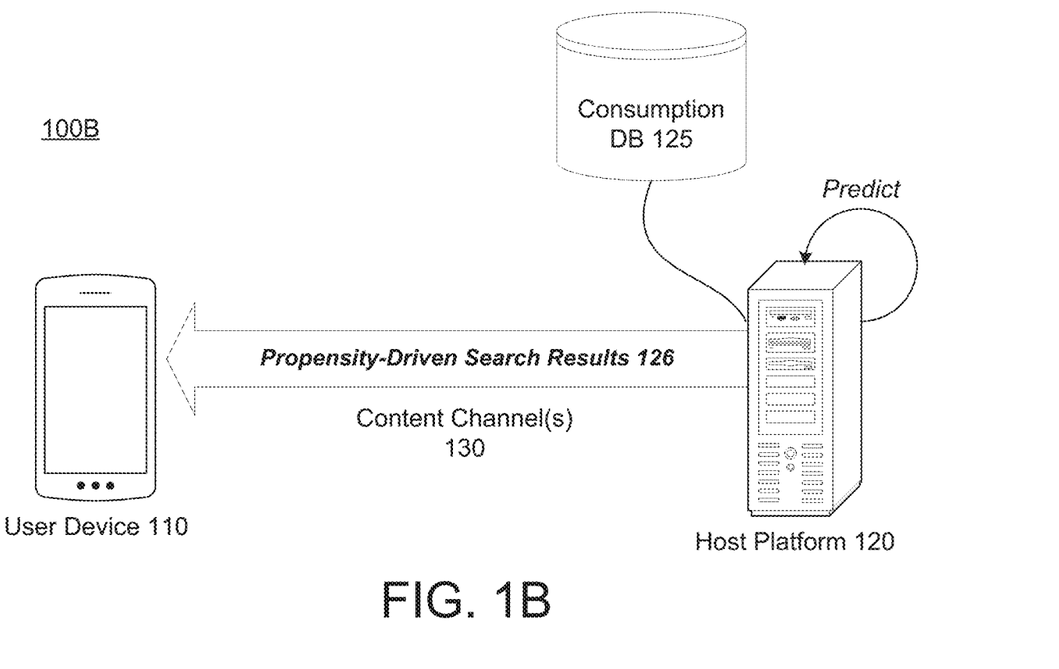

FIGS. 1A and 1B illustrate a system for generating propensity-driven search results in accordance with an example embodiment. In the example of FIG. 1A, a host platform 120 generates propensity-driven search results that a user is likely to be interested in (propensity to apply/work, etc.). It should also be appreciated that the system shown in FIGS. 1A and 1B may be used to generate information about how similar users earn income from secondary opportunities via collaborative filtering.

Referring to FIG. 1A, the host platform 120 may acquire web data from a plurality of websites in accordance with an example embodiment. For example, the host platform 120 may crawl servers (e.g., host servers, web servers, application servers, mobile servers, etc.) which host websites and mobile applications that promote job postings (or other postings/listings). According to various aspects, the host platform 120 may scrape or otherwise acquire web-based data from the web servers. The host platform 120 may correspond to a search engine or aggregation engine in which search results are aggregated from multiple websites. The host platform 120 may include a web server, a cloud platform, a database, and the like.

The web-based data stored by the web servers may be automatically scraped on a periodic or regular basis (e.g., once a day, etc.), randomly, in response to a condition, and the like. The job postings may include information in text-based format such as a string of characters and numbers. The text-based data may be unstructured in that it does not require a common format or it may be in a structure format.

According to various aspects, in step 100A shown in FIG. 1A, a user device 110 may generate a request (e.g., HTTP, etc.) while visiting a website (user interface 122) hosted by the host platform 120. The request may include a search/query request for employment opportunities that may be submitted through a search bar 124, however, embodiments are not limited thereto. As another example, the user may generate a submit a request by selecting a button or link on the website, in an email, in a SMS message, on an advertisement (on another website, mobile page, etc.) As another example, the host platform 120 may provide the employment opportunities to the user device 110 without the need for requests to be entered. For example, a user of the user device 110 may enroll in regular opportunities being transmitted to the user device 110 such as through email, SMS, phone calls, or the like.

Referring now to FIG. 1B, in step 100B, the host platform 120 may retrieve consumption data of the user of the user device 110 from a database such as consumption DB 125. As another example, the consumption data may be retrieved from external sources (e.g., credit card company, payment processor, banks, financial institutions, etc.) via one or more APIs. The consumption data may include credit card statements with purchases and descriptions of the purchases. As another example, the consumption data may include cookies data that is collected of the user's network traffic on the Internet. The consumption data may provide a view as to what sort of interests affect the user's ability to make income, the user's need for income, the user's behavior with income, and the like.

Based on the consumption, the host platform 120 may execute a predictive model which can predict employment opportunities (also referred to herein as value-generating opportunities) that a user is going to be interested in based on the consumption data. Next, the host platform 120 may provide the results 126 to the user device as propensity-driven search results. In other words, the results may be identified as more optimal based on a propensity of the user of the user device 110 to not only be interested in the employment opportunity but also earn money from the employment opportunity. Here, the predictive model may be trained from historical data of other users who have been on the employment website and earned income from secondary employment opportunities through the website.

The search results 126 (optimal value-generating opportunities) may be delivered to the user device 110 through various channels between the host platform 120 and the user device 110. For example, the host platform 120 may send an email to an email account of the user, may send a SMS to a phone account of the user, may transmit data to a screen of the user device 110 (website, advertisement, push notification, etc.), and the like. The host platform 120 is not limited in the ways it can communicate with the user device 110 to provide search results.

Figure 2A:
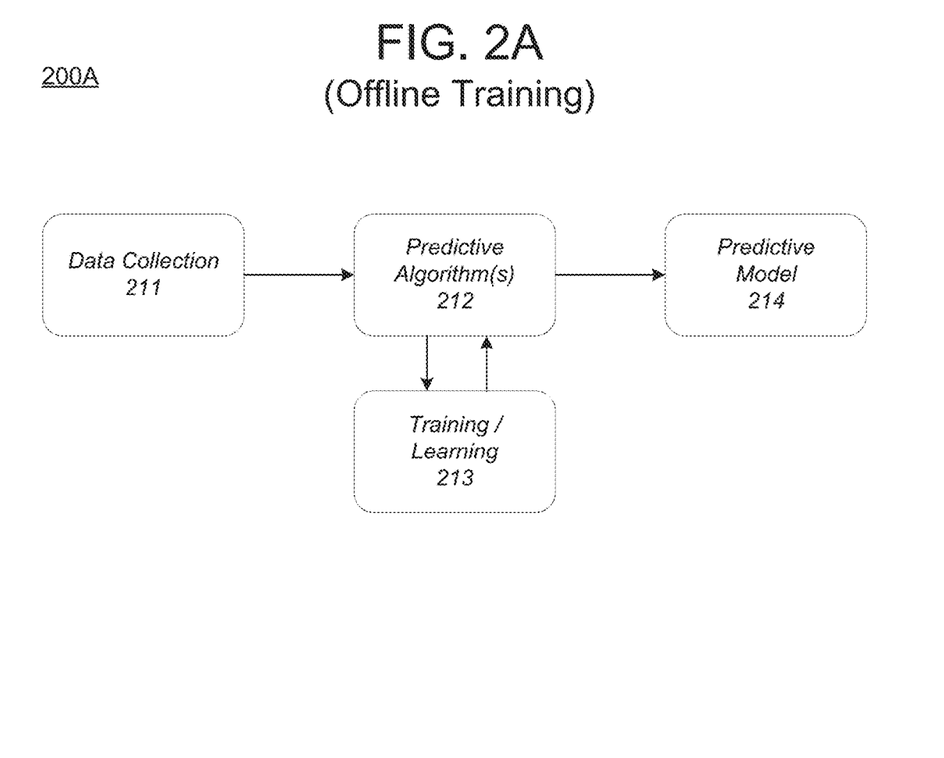
FIGS. 2A and 2B are diagrams illustrating execution environments of a predictive model for recommending value-generating opportunities in accordance with an example embodiment.
Figure 2B:
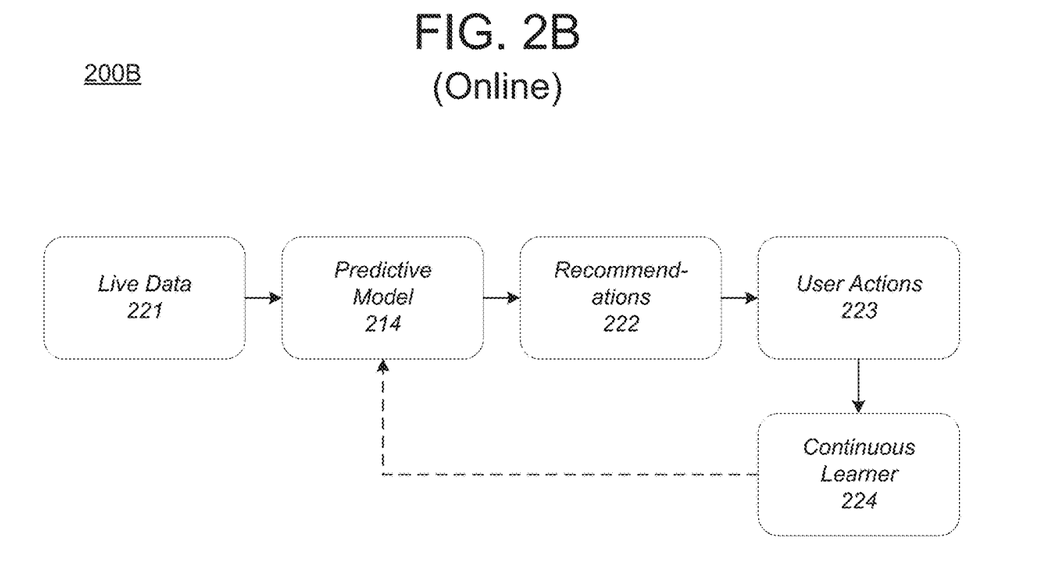
Figure 2C:
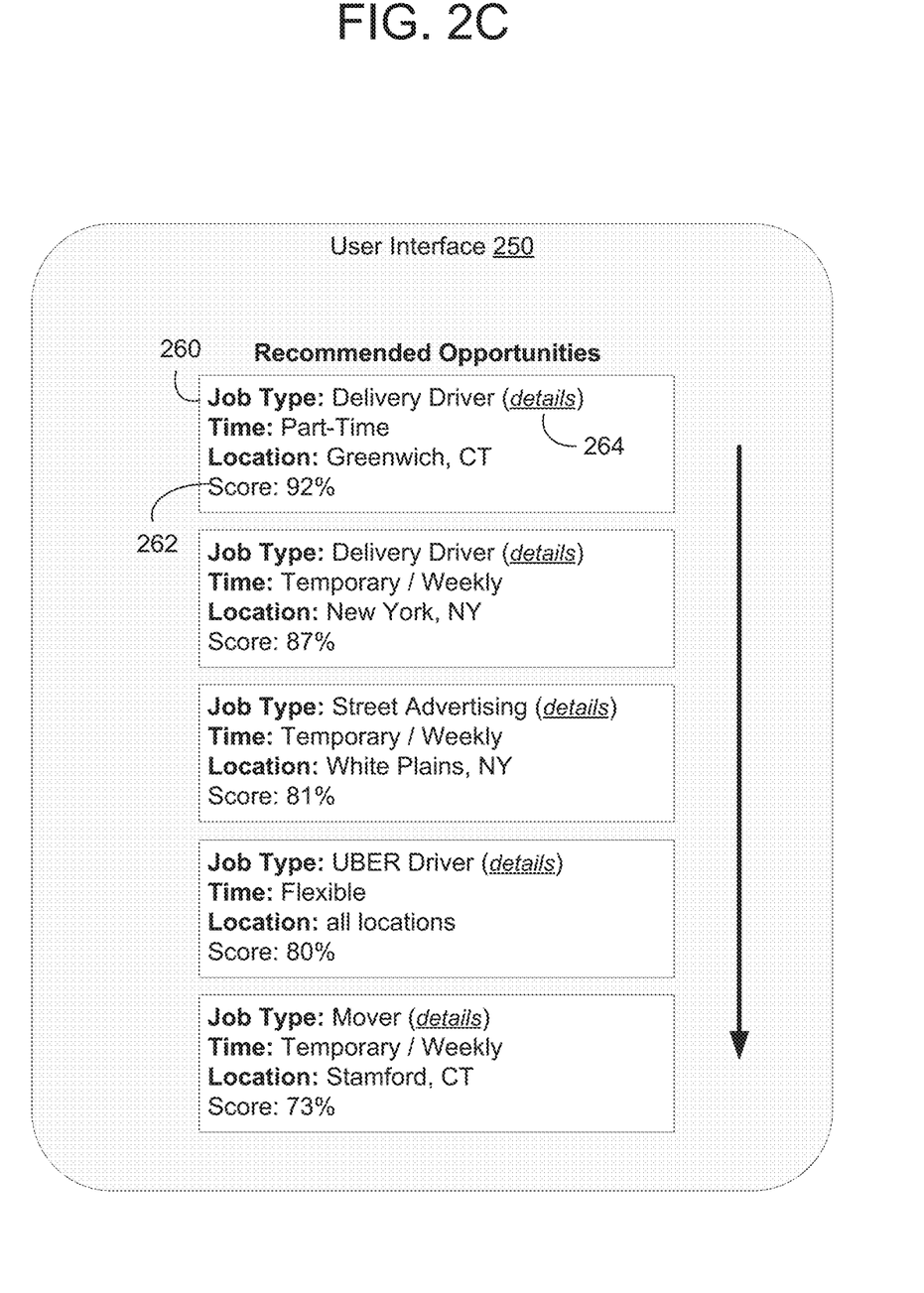
FIG. 2C is a diagram illustrating a user interface displaying recommended value-generating opportunities in accordance with an example embodiment.

FIGS. 2A and 2B illustrate execution environments (e.g., offline training 200A and online 200B) of a predictive model 214 for recommending value-generating opportunities in accordance with an example embodiment, and FIG. 2C illustrates a user interface 250 displaying recommended value-generating opportunities in accordance with an example embodiment. As will be appreciated, two people with a same primary source of employment (e.g., school teachers) may have very different desires when it comes to secondary employment. For example, one teacher may be interested in sewing quilts and selling them via a homemade goods website, while another teacher may be interested in performing odd constructions jobs when they are available. Therefore, going by work history information alone can be a difficult gauge of interest for a user's interest in secondary employment.

Referring to FIG. 2A, the offline training environment 200A includes a data collection module 211 for collecting historical consumption data of other users, as well as secondary employment information of the other users. The other users may have a similar geography, etc. The consumption data may include behavioral information of the users such as spending, network activity, device activity, and the like, which can be used to identify income information about the users. There are certain things/items that everyone spends money on (food, etc.). So not all consumptions are indicators for your propensity to create value. That said, if you are spending money consistently at a home improvement store that may rank you higher to do home services work. Patterns in spending may indicate a propensity to accept a job.

A predictive algorithm module 212 may include one or more predictive algorithms (e.g., neural networks, binary forests, classifications, etc.) also referred to as machine learning which can be used identify patterns within the spending activity versus the secondary employment opportunities that were chosen by the users. The predictive algorithm may include multiple variables for different attributes such as responsibility taken, activities created, value created, and people involved. Each of these variables may be given its own respective weight which can be tuned during by a training module 213 until a desired predictive accuracy is reached. If the system changes any of these variables a change in an amount of money that can be made may also occur.

The resulting trained model is the predictive model 214 which can receive consumption data as input, and predict which value-generating opportunities to recommend (from a pool of available job opportunities) of the website. As one simple example, if a person spends money on dog food, there is a better chance that the person will be interested in taking a job/opportunity that involves pets. A more complex scenario may be a pattern between a person who spends money on golf equipment may be interested in a job involving outdoor activities.

Referring to FIG. 2B, once trained, the predictive model 214 can be used to make predictions for live data. Here, the system may prompt a user for their interest in employment opportunities based on their consumption data, and create a score for activities that you have a higher propensity to do for value creation. In this example, a live data module 221 may collect current consumption data of a user, which is then input into the predictive model 214. The output of the predictive model may be recommendations by a recommendation module 222 for one or more employment based opportunities that are output to a screen or some other medium where it is receivable by the user. The opportunities may be scored or otherwise tuned by the recommendation module 222 based on attributes of the user such as background information, user interests, geography, and the like, which may be stored in a user profile, or the like.

FIG. 2C illustrates an example of a user interface 250 which is displaying recommend opportunities to a user. Here, each opportunity 260 may include information about the employment opportunity, a location, a type of work (e.g., part-time, full-time, one-time, temporary, etc.) and a score 262. The score may be determined based on user interests, previous history of work, consumption, and the like. The recommended opportunities may be listed in order of which receives the highest score 262. Each opportunity may further include an additional information link 264 which may be selected by the user to navigate to a job posting, website, etc., associated with the employment opportunity.

Furthermore, the recommendations may be monitored or otherwise tracked by a user actions module 223 which tracks not only what recommendations are output but what recommendations are actually selected and used to earn income for the user. This information can be fed back by a continuous learning module 224 to the predictive model 214 to enable the predictive model to be continuously updated based on both past and present behavior of the user.

In some cases, other data such as income data (not just consumption) may be used to train the predictive model. Other data points used to train the predictive model 214 may be actual behavior (usage behavior in the website, app, etc.) For example, the system may monitor the user's behavior in a social network and identify that the user has made a comment, a like, etc., or has otherwise digested/read content of certain types. This behavior can be used to determine interests of the user (indicators) in certain jobs you might be interested in.

Accordingly, the predictive model 214 may be trained using consumption, income, content engagement, app/website behavior, and the like, which can be used to suggest job opportunities. The scoring can be used to give weights to different items that are found. There may also be an overall recommendation (i.e., a most optimal job opportunity, etc.) In some embodiments, the system may also determine when (i.e., a period of time) a user is most likely to be responsive to a recommended employment opportunity. In this case, the system may output/give the recommendation at the optimal time. For example, if the current time is the end of the month and a bunch of money was just spend on bills, the user may be more likely to be responsive to recommended employment opportunities. As another example, if a user just spent money at a pet store, this might be an optimal time to send a recommendation to perform a dog walking job. There is continuous machine learning by the learner module 224 because which is optimizing the predictive model 214 for a particular user over time. This may be independently done for each user. Each individual is going to have different data sets and they are responding in different ways to different situations. It's an iterative optimization because the system learns more about the user as the time goes by.

Figure 3A:
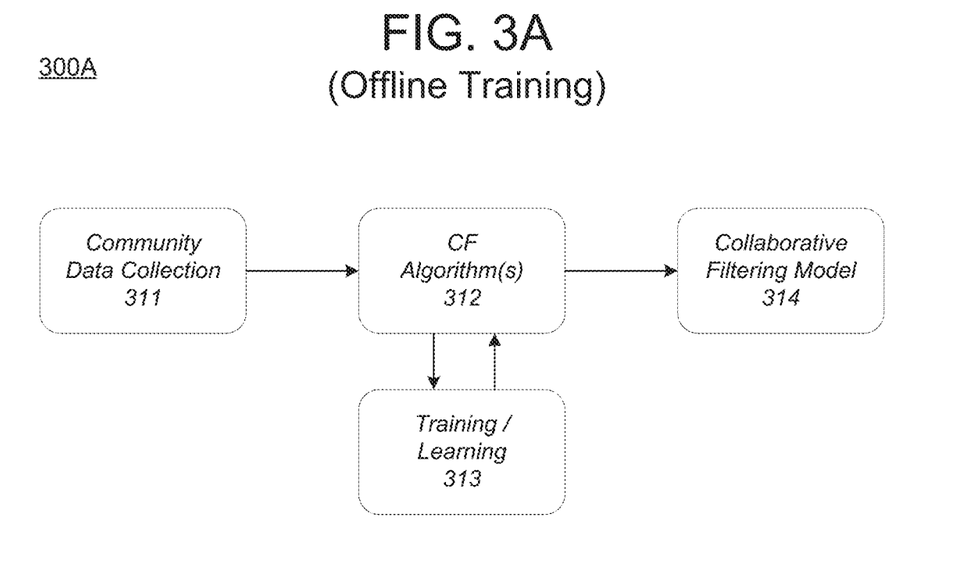
FIGS. 3A and 3B are diagrams illustrating execution environments of a collaborative filtering model for determining value-generating behavior of other users in accordance with an example embodiment.
Figure 3B:
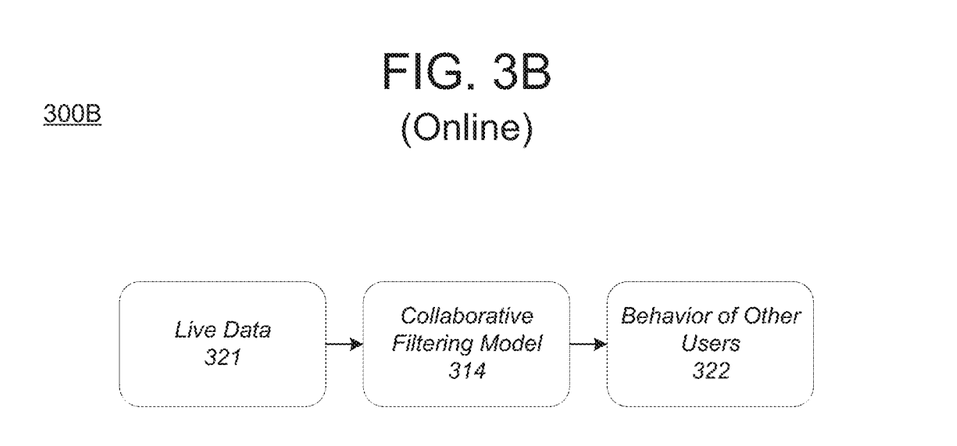
Figure 3C:
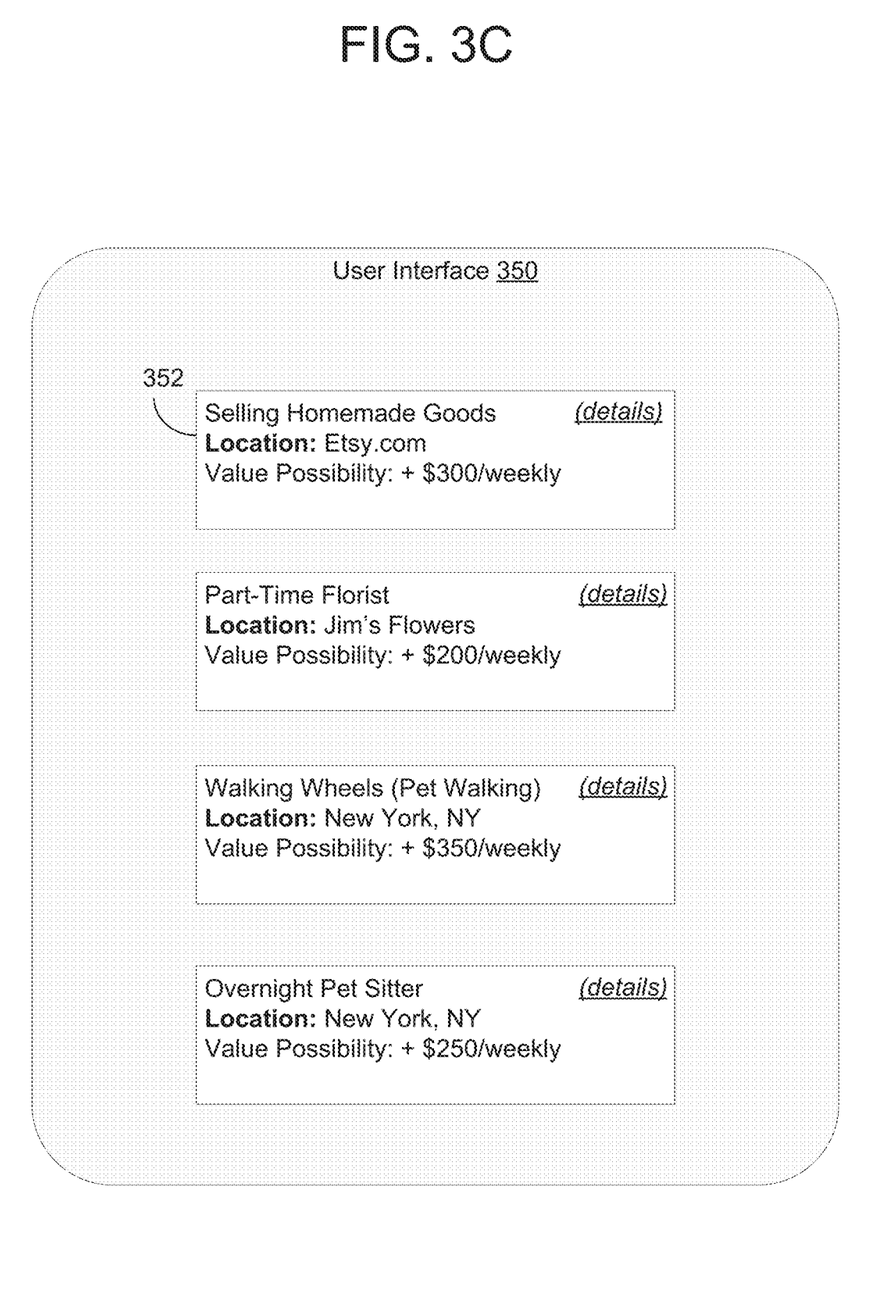
FIG. 3C is a diagram illustrating a user interface displaying a determined value generating behavior of other users in accordance with an example embodiment.

FIGS. 3A and 3B illustrate execution environments ((e.g., offline training 300A and online 300B) of a collaborative filtering model 314 for determining value-generating behavior of other users in accordance with an example embodiment, and FIG. 3C illustrates a user interface 350 displaying a determined value generating behavior of other users in accordance with an example embodiment. In this example, the system may output employment opportunities (value-generating opportunities) such as shown in FIG. 2C. As another example, the system may output a description or other information that informs the user of different opportunities without necessarily outputting job postings. Here, the system may show the user what other users with similar consumption and productivity attributes do to make secondary income. This can provide a new user to the system with some ideas of how to make secondary income, especially if they are unaware of all the available opportunities that are out there.

In this example, the collaborative filtering model 314 may teach a user how people with similar attributes make money through secondary income. In other words, how people with similar attributes (consumption behavior, productivity, geography, etc.) make additional income. Referring to the example of FIG. 3A, a data collection module 311 may collect employment (secondary employment) of other users as well as productivity attributes (work history, experience, education, location, etc.), and consumption attributes (e.g., spending behavior, Internet usage behavior, device usage behavior, etc.). In response, a collaborative filtering algorithm (or algorithms) 312 may be trained via a training module 313.

Here, the training may include applying different levels of weight to different employment opportunities (value-generating opportunities) based on a level of interest. For example, a first weight may be applied to an opportunity in which a user showed surface interest (looked at the opportunity), a second weight may be applied to an opportunity in which the user took a step towards the job (reached out via email, phone, applied, etc.), and a third weight may be applied to an opportunity which the user successfully earned income from. When the collaborative filtering algorithm has reached an acceptable lever of accuracy, the algorithm can be incorporated into a trained collaborative filtering model 314.

The concept of "other people like you" can be tricky to classify because two people with similar primary employment (work experience, education, etc.) may have completely different interests when it comes to secondary employment. The collaborative filtering groups people so when you make a work recommendation it is relevant. This is totally different than food, or entertainment. Instead, the collaborative filtering model 314 may include both productivity competence as well as consumption behavior. Productivity attributes may include work experience (what you do to make money), typical work times, amount of time spent working, etc. Furthermore, consumption attributes (how do you spend your money) may also be considered by the collaborative filtering model 314. When a group of people have similar productivity and similar consumption, etc. then they might be interested in similar things.

Accordingly, the collaborative filtering described herein includes a method of making automatic predictions (filtering) about the value-generating interests of a user by collecting value-generating information of many users (collaborating). The underlying assumption of the collaborative filtering approach is that if a person A has the same consumption and/or production as a person B, A is more likely to have B's opinion on a value-generating opportunities of interest than that of a randomly chosen person.

The CF algorithms 312 may give more weight to employment positions which are actually chosen and used to earn value versus employment positions which are just given surface interest by the users. Therefore, the resulting collaborative filtering model 314 can apply different weights for different levels of success.

Referring to FIG. 3B, an online environment 300B is shown. Here, a live data module 321 may capture live data of a current user (productivity data, consumption data, etc.) which is used by the collaborative filtering model 314 to show the current user how other people with similar productivity and consumption do for secondary income. This can be output as behavior to other users 322. An example of the output of the collaborative filtering module 314 is shown in the user interface 350 of FIG. 3C. Here, different employment positions 352 which are performed by other users with similar attributes (productivity, consumption, etc.) is shown.

Figure 4:
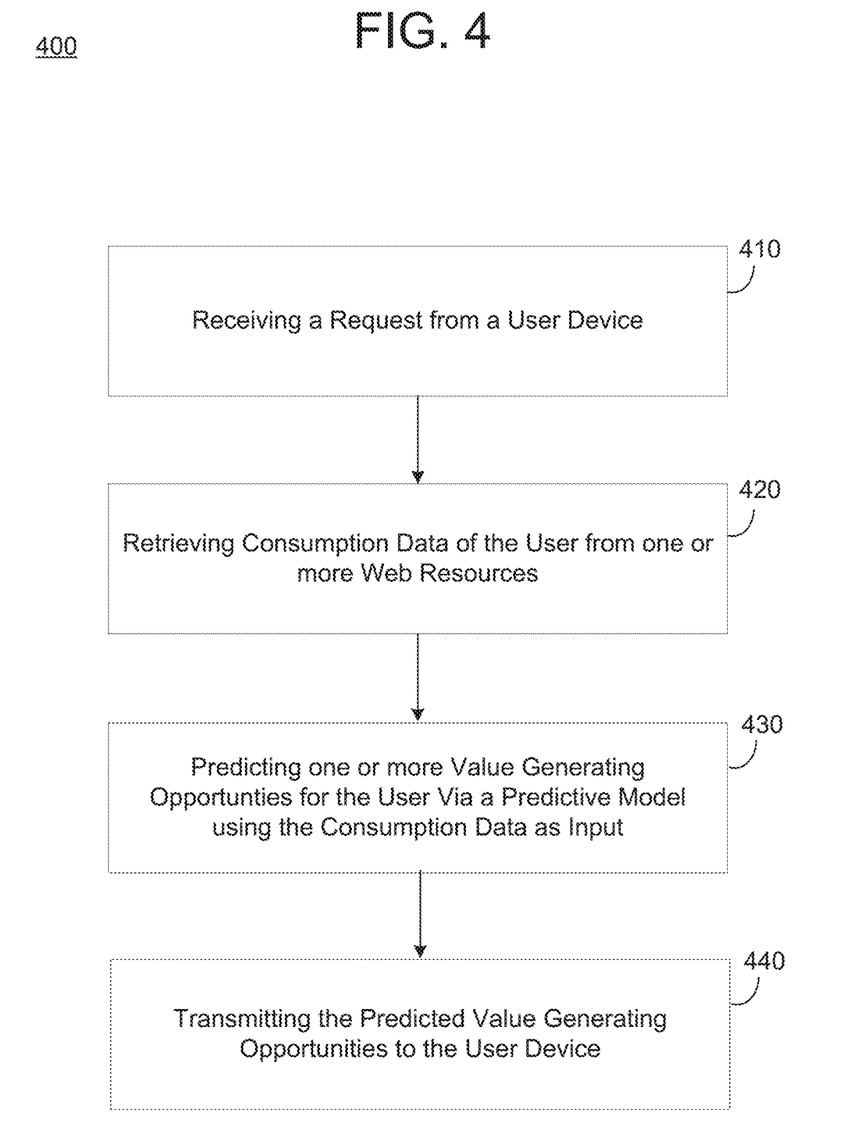
FIG. 4 is a diagram illustrating a method of predicting value-generating opportunities of interest to a user in accordance with an example embodiment.

FIG. 4 illustrates a method 400 of predicting value-generating opportunities of interest to a user in accordance with an example embodiment. For example, the method 400 may be performed by a computing device or a group of computing devices, such as a user device, a server, a host platform, a cloud computing environment, and the like. Referring to FIG. 4, in 410, the method may include receiving a request from a user device. For example, the request may be a search query being input, a message being sent, a button being pressed, etc. As another example, the method may omit the receiving of a request and may perform the rest of the method without an express request.

In 420, the method may include retrieving consumption data of a user associated with the user device and geographic location data of at least one of the user and the user device, the consumption data may include income spending behavior of the user captured over time. For example, the consumption data may include credit card data, bank account data, receipts, and the like. In some embodiments, the consumption data may include one or more of spending usage behavior, mobile device usage behavior, and Internet usage behavior, which are retrieved via one or more APIs.

In 530, the method may include predicting one or more value-generating opportunities for the user from among a pool of value-generating opportunities via execution of a predictive model. For example, execution of the predictive model may determine a propensity of the user to respond to the value-generating opportunities based on the behavioral attributes included in the retrieved consumption data of the user and the geographical location data. In 540, the method may include transmitting the one or more predicted value-generating opportunities to the user device via a content channel between the server and the user device.

In some embodiments, the one or more predicted value-generating opportunities may include one or more employment positions listed on at least one of an employment-based website and an employment-based mobile application. In some embodiments, the predicting may include predicting an optimal value-generating opportunity from among multiple value-generating opportunities based on a neural network which receives the consumption data and a geographical location of the user as inputs, and outputs the predicted one or more value-generating opportunities.

Figure 5:
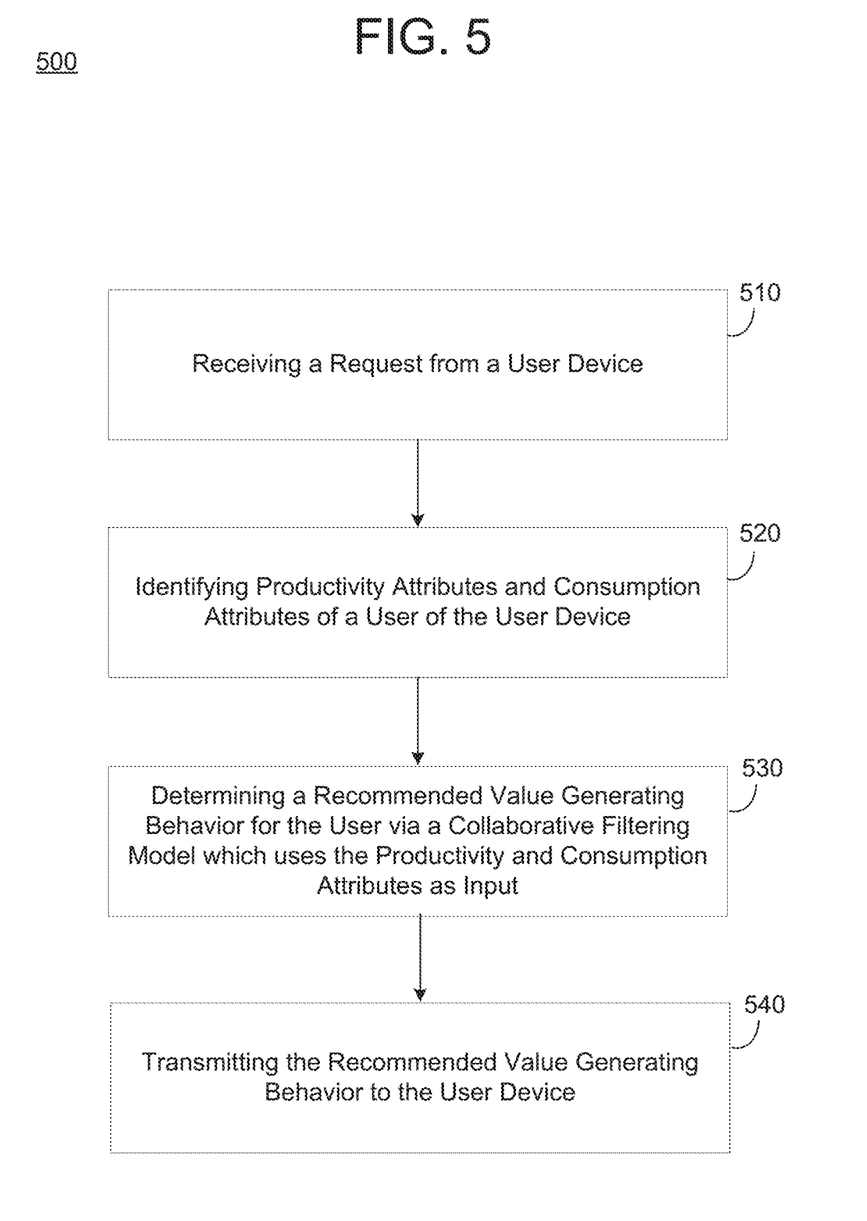
FIG. 5 is a diagram illustrating a method of recommending value-generating behavior based on collaborative filtering in accordance with an example embodiment.

According to various aspects, the predictive algorithm may include variables for responsibility, activity creation, value creation, and people involved, and each of the variables comprise respective weights. In some embodiments, the predictive model may be iterative updated based on actions by the user. For example, the predictive model may be iteratively updated based on additional consumption data of the user retrieved over time. In some embodiments, the transmitting may include transmitting information about the one or more selected value-generating opportunities to the user device via at least one of a webpage, an email, a text message, and a phone call. In some embodiments, the method may further include determining an optimal period of time to transmit the one or more selected value-generating opportunities based on time-based attributes within the consumption data FIG. 5 illustrates a method 500 of recommending value-generating behavior based on collaborative filtering in accordance with an example embodiment. For example, the method 500 may be performed by a computing device or a group of computing devices, such as a user device, a server, a host platform, a cloud computing environment, and the like. Referring to FIG. 5, in 510, the method may include receiving a request from a user device. For example, the request may be a search query being input, a message being sent, a button being pressed, etc. As another example, the method may omit the receiving of a request and may perform the rest of the method without an express request.

In 520, the method may include identifying productivity attributes and consumption attributes of a user associated with the user device based on behavior of the user captured over time. Productivity attributes may include income generating behavior which indicates how a user generates income such as work experience, secondary employment experience, preferred working times, hours of productivity a week, and the like. Consumption attributes may include income spending behavior which indicates how a user spend their earned income. For example, the productivity attributes may include employment attributes from an employment history, and the consumption attributes may include behavioral attributes identified from one or more of spending activity, Internet usage activity, and mobile device activity.

In 530, the method may include determining a recommended value-generating behavior for the user via execution of a collaborative filtering model. For example, the collaborative filtering model may receive the productivity and consumption attributes of the user and predict the recommended value-generating behavior based on historical value-generating behavior of other users having similar productivity attributes and consumption attributes. In addition, in 540 the method may include transmitting the recommended value-generating behavior to the user device via a content channel between the server and the user device.

In some embodiments, the execution of the collaborative filtering model may determine one or more recommended employment positions based on collaborative filtering of historical employment positions performed by the other users. In some embodiments, the execution of the collaborative filtering model may include filtering employment positions performed by a community of users within a predetermined geographical distance of the user of the user device to generate a list of recommended value-generating behaviors. In some embodiments, the execution of the collaborative filtering model may further include ranking the recommended value-generating behaviors based on the productivity attributes and consumption attributes of the user. In some embodiments, the execution of the collaborative filtering model may include applying different recommendation weights to employment positions that the other users have read versus employment positions that the other users have successfully earned value from. In some embodiments, the transmitting may include transmitting information about the recommended value-generating behavior to the user device via at least one of a webpage, an email, a text message, and a phone call.

The above embodiments may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 6:
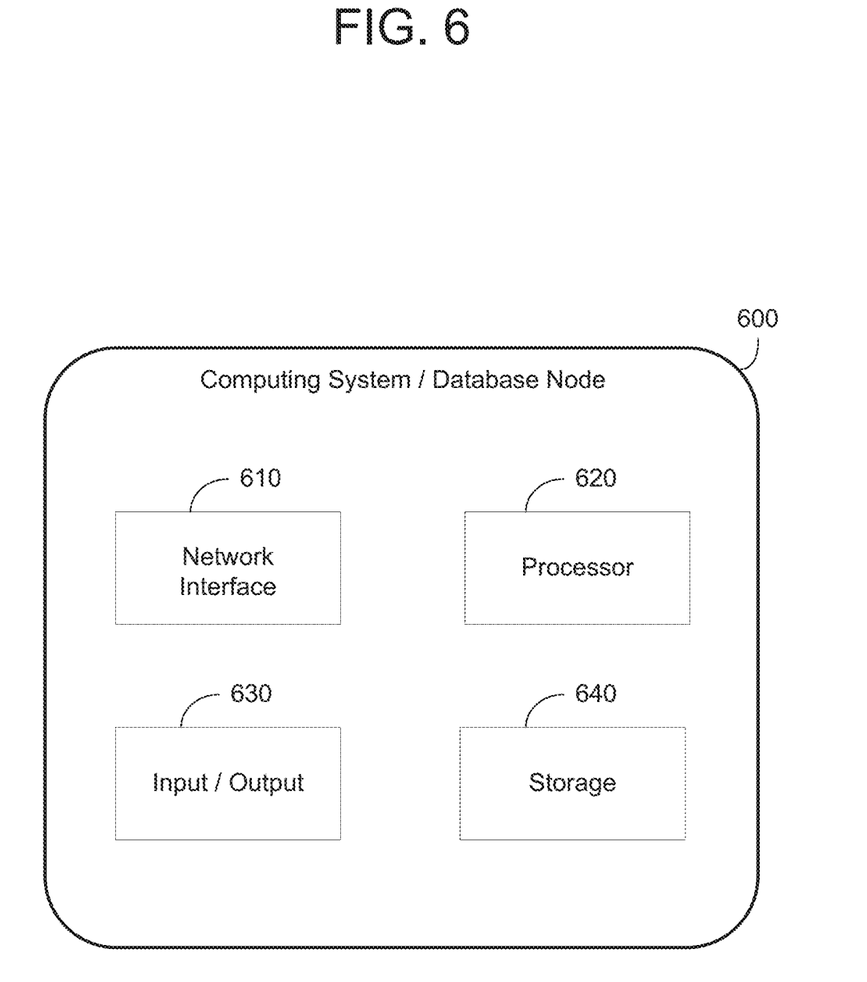
FIG. 6 is a diagram illustrating a computing system for use in the example embodiments described herein.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 6 illustrates an example computing system 600 which may represent or be integrated in any of the above-described components, etc. FIG. 6 is not intended to suggest any limitation as to the scope of use or functionality of embodiments described herein. The computing system 600 is capable of being implemented and/or performing any of the functionality set forth hereinabove.

The computing system 600 may include a computer system/server, which is operational with numerous other general purpose or special purpose computing system environments or configurations. Examples of well-known computing systems, environments, and/or configurations that may be suitable for use as computing system 600 include, but are not limited to, personal computer systems, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, databases, and the like, which may include any of the above systems or devices, and the like. According to various embodiments described herein, the computing system 600 may be a tokenization platform, server, CPU, or the like.

The computing system 600 may be described in the general context of computer system-executable instructions, such as program modules, being executed by a computer system. Generally, program modules may include routines, programs, objects, components, logic, data structures, and so on that perform particular tasks or implement particular abstract data types. The computing system 600 may be practiced in distributed cloud computing environments where tasks are performed by remote processing devices that are linked through a communications network. In a distributed cloud computing environment, program modules may be located in both local and remote computer system storage media including memory storage devices.

Referring to FIG. 6, the computing system 600 is shown in the form of a general-purpose computing device. The components of computing system 600 may include, but are not limited to, a network interface 610, one or more processors or processing units 620, an output 630 which may include a port, an interface, etc., or other hardware, for outputting a data signal to another device such as a display, a printer, etc., and a storage device 640 which may include a system memory, or the like. Although not shown, the computing system 600 may also include a system bus that couples various system components including system memory to the processor 620.

The storage 640 may include a variety of computer system readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random access memory (RAM) and/or cache memory. As another example, storage device 640 can read and write to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, storage device 640 may include at least one program product having a set (e.g., at least one) of program modules that are configured to carry out the functions of various embodiments of the application.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Although not shown, the computing system 600 may also communicate with one or more external devices such as a keyboard, a pointing device, a display, etc.; one or more devices that enable a user to interact with computer system/server; and/or any devices (e.g., network card, modem, etc.) that enable computing system 600 to communicate with one or more other computing devices. Such communication can occur via I/O interfaces. Still yet, computing system 600 can communicate with one or more networks such as a local area network (LAN), a general wide area network (WAN), and/or a public network (e.g., the Internet) via network interface 610. As depicted, network interface 610 may also include a network adapter that communicates with the other components of computing system 600 via a bus. Although not shown, other hardware and/or software components could be used in conjunction with the computing system 600. Examples include, but are not limited to: microcode, device drivers, redundant processing units, external disk drive arrays, RAID systems, tape drives, and data archival storage systems, etc.

According to various embodiments, the computing system 600 may predict one or more value-generating opportunities for a user based on a propensity of the user to response to the value-generating opportunities. In this example, the processor 620 may retrieve consumption data of a user associated with the user device and geographic location data of at least one of the user and the user device, the consumption data comprising behavior of the user captured over time. The processor 620 may predict one or more value-generating opportunities for the user from among a pool of value-generating opportunities via execution of a predictive model, where the predictive model determines a propensity of the user to respond to the value-generating opportunities based on the behavioral attributes included in the retrieved consumption data of the user and the geographical location data. Further, the processor 620 may control the network interface 610 to transmit the one or more predicted value-generating opportunities to the user device via a content channel between the server and the user device.

According to various embodiments, the computing system 600 may be used to display to a user how other similar users generate secondary income via a collaborative filtering model. In this example, the processor 620 may identify productivity attributes and consumption attributes of a user associated with the user device based on behavior of the user captured over time. The processor 620 may determine a recommended value-generating behavior for the user via execution of a collaborative filtering model, where the collaborative filtering model receives the productivity and consumption attributes of the user and predicts the recommended value-generating behavior based on historical value-generating behavior of other users having similar productivity attributes and consumption attributes. Furthermore, the processor 620 may control the network interface 610 to transmit the recommended value-generating behavior to the user device via a content channel between the server and the user device.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described regarding specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system, comprising:
a network interface configured to receive a request from a user device; and
a processor configured to
train a predictive model to determine a propensity of a user to accept an employment opportunity based on patterns between spending activity and employment opportunities accepted by a plurality of users,
retrieve spending data of a user associated with the user device, the spending data comprising spending activity of the user captured over time, and
predict one or more employment opportunities for that the user will accept from among a pool of employment opportunities via execution of the predictive model, wherein the predictive model identifies a pattern between a product type included in the spending activity of the user included in the spending data and the geographical location data the one or more employment opportunities,
wherein the processor further controls the network interface to transmit information about the one or more employment opportunities to the user device via a content channel between the server and the user device.

2. The computing system of claim 1, wherein the one or more predicted employment opportunities comprise one or more employment positions listed on at least one of an employment-based website and an employment-based mobile application.

3. The computing system of claim 1, wherein the processor is further configured to train the predictive model based on one or more of mobile device usage behavior and Internet usage behavior, which are retrieved by the processor via one or more application programming interfaces (APIs).

4. The computing system of claim 1, wherein the processor is configured to predict an optimal employment opportunity from among multiple employment opportunities based on a neural network which receives the spending data as input, and outputs the predicted optimal employment opportunity.

5. The computing system of claim 4, wherein the predictive model comprises an algorithm with variables for responsibility, activity creation, value creation, and people involved, and each of the variables comprises a respective weight.

6. The computing system of claim 1, wherein the processor is configured to iteratively modify the predictive model for the user based on additional spending data of the user retrieved over time.

7. The computing system of claim 1, wherein the network interface is configured to transmit information about the one or more employment opportunities to the user device via at least one of a webpage, an email, a text message, a page of a mobile application on the user device, and a phone call.

8. The computing system of claim 1, wherein the processor is further configured to determine an optimal period of time to transmit the information about the one or more employment opportunities to the user device based on time-based attributes within the spending data.

9. A method, comprising:
receiving a request from a user device;
training a predictive model to determine a propensity of a user to response to accept an employment opportunity based on patterns between spending activities and employment opportunities accepted by a plurality of users;
retrieving spending data of a user associated with the user device, the spending data comprising spending activity of the user captured over time;
predicting one or more employment opportunities for that the user will accept from among a pool of employment opportunities via execution of the predictive model, wherein the predictive model identifies a pattern between a product type included in the spending activity of the user included in the spending data and the one or more employment opportunities; and
transmitting information about the one or more employment opportunities to the user device via a content channel between the server and the user device.

10. The method of claim 9, wherein the one or more employment opportunities comprise one or more employment positions listed on at least one of an employment-based website and an employment-based mobile application.

11. The method of claim 9, wherein the training further comprises training the predictive model based on one or more of mobile device usage behavior and Internet usage behavior, which are retrieved via one or more application programming interfaces (APIs).

12. The method of claim 9, wherein the predicting comprises predicting an optimal employment opportunity from among multiple employment opportunities based on a neural network which receives the spending data as input, and outputs the predicted optimal employment opportunity.

13. The method of claim 12, wherein the predictive model comprises an algorithm with variables for responsibility, activity creation, value creation, and people involved, and each of the variables comprise respective weights.

14. The method of claim 9, wherein the method further comprises iteratively modifying the predictive model for the user based on additional spending data of the user retrieved over time.

15. The method of claim 9, wherein the transmitting comprises transmitting information about the one or more employment opportunities to the user device via at least one of a webpage, an email, a text message, a page of a mobile application on the user device, and a phone call.

16. The method of claim 9, further comprising determining an optimal period of time to transmit the information about the one or more employment opportunities to the user device based on time-based attributes within the spending data.

17. A non-transitory computer-readable medium storing instructions which when executed cause a computer to perform a method comprising:
receiving a request from a user device;
training a predictive model to determine a propensity of a user to response to accept an employment opportunity based on patterns between spending activities and employment opportunities accepted by a plurality of users;
retrieving spending data of a user associated with the user device, the spending data comprising spending activity of the user captured over time;
predicting one or more employment opportunities that the user will accept from among a pool of employment opportunities via execution of the predictive model, wherein the predictive model identifies a pattern between a product type included in the spending activity of the user included in the spending data and the one or more employment opportunities; and transmitting information about the one or more employment opportunities to the user device via a content channel between the server and the user device.

18. The non-transitory computer-readable medium of claim 17, wherein the one or more employment opportunities comprise one or more employment positions listed on at least one of an employment-based website and an employment-based mobile application.

19. The non-transitory computer-readable medium of claim 17, wherein the training further comprises training the predictive model based on one or more of mobile device usage behavior and Internet usage behavior, which are retrieved via one or more application programming interfaces (APIs).

20. The non-transitory computer-readable medium of claim 17, wherein the predictive model comprises an algorithm with variables for responsibility, activity creation, value creation, and people involved, and each of the variables comprise respective weights.

* * * * *